(12) United States Patent
Pendlebury (10) Patent No.: US 9,856,780 B2
(45) Date of Patent: Jan. 2, 2018

(54) INTERNAL COMBUSTION ENGINE WITH AN ADJUSTABLE VOLUME INDUCTION CHAMBER

(71) Applicant: Colin Pendlebury, Liverpool (GB)

(72) Inventor: Colin Pendlebury, Liverpool (GB)

( * ) Notice: Subject to any disclaimer, the term of this patent is extended or adjusted under 35 U.S.C. 154(b) by 0 days.

(21) Appl. No.: 15/108,988

(22) PCT Filed: Dec. 19, 2014

(86) PCT No.: PCT/GB2014/053776
§ 371 (c)(1),
(2) Date: Jun. 29, 2016

(87) PCT Pub. No.: WO2015/101778
PCT Pub. Date: Jul. 9, 2015

(65) Prior Publication Data
US 2016/0326945 A1    Nov. 10, 2016

(30) Foreign Application Priority Data

Dec. 30, 2013   (GB) .................................. 1323124.6

(51) Int. Cl.
| | |
|---|---|
| *F02B 19/06* | (2006.01) |
| *F01B 31/14* | (2006.01) |
| *F02B 75/04* | (2006.01) |
| *F02D 15/04* | (2006.01) |
| *F02B 41/06* | (2006.01) |
| *F02B 75/02* | (2006.01) |

(52) U.S. Cl.
CPC .............. *F02B 19/06* (2013.01); *F01B 31/14* (2013.01); *F02B 41/06* (2013.01); *F02B 75/042* (2013.01); *F02D 15/04* (2013.01); *F02B 2075/025* (2013.01); *Y02T 10/125* (2013.01)

(58) Field of Classification Search
CPC ........ F02B 41/06; F02B 19/06; F02B 75/042; F02B 2075/025; F01B 31/14; F02D 15/04
See application file for complete search history.

(56) References Cited

FOREIGN PATENT DOCUMENTS

DE           3117133 A1 * 11/1982 ............. F02D 15/04

* cited by examiner

*Primary Examiner* — Hieu T Vo (57) ABSTRACT

An internal combustion engine (10) comprising: a piston (12) arranged to reciprocate within a cylinder (14); an adjustable volume induction chamber (50) communicating with the cylinder (14); an air inlet port (30) communicating (42) with the induction chamber (50), the air inlet port (30) being connectable, in use, to a pressurized air supply (38); an air inlet valve (32) configured to selectively open and close the air inlet port (30); and a fuel injector (70) communicating with the induction chamber (50), wherein the valve (32) and fuel injector (70) are together configured, in use, to deliver a charge comprising a fuel-air mixture into the induction chamber (50).

12 Claims, 8 Drawing Sheets

INTERNAL COMBUSTION ENGINE WITH AN ADJUSTABLE VOLUME INDUCTION CHAMBER

CROSS-REFERENCE TO RELATED APPLICATIONS

This application claims priority to the PCT Application PCT/GB2014/053776 filed on 19 Dec. 2014 which further claims the priority of Patent applications no GB1323124.6 filed on 30 Dec. 2013 filed in the UK Patent and Trademark Office. The specification of the above referenced patent applications is incorporated herein by reference in its entirety

BACKGROUND

This invention relates to reciprocating internal combustion engines and in particular, but without limitation to higher efficiency regenerative cycle internal combustion engines in which the principles of isothermal compression and regeneration of exhaust gas heat can be applied as far as is practical.

The requirement to obtain maximum efficiency from reciprocating internal combustion engines has always been of interest to the designer but additional considerations of simplicity, reliability and ease of manufacture must all be factored in to produce an affordable engine sufficiently rugged to meet the demands of general public use. Therefore, it is of little surprise to observe that all attempts to bring into mass production reciprocating engines working on the highest possible efficiency cycles such as the Stirling and Ericsson cycles have failed. In fact, considerable resources have been committed to developing a practical Stirling cycle engine but to date the efforts have failed to deliver both the hoped for theoretical efficiency, or the reliability, demanded by commercial enterprise. However, the present world climate with massively increased daily use of vehicular transport by the developing nations, coupled with finite fossil fuel supplies, burgeoning levels of exhaust emissions, and global warming, now places an urgent demand for a simple, affordable and rugged reciprocating engine which can work as closely to the maximum ideal thermodynamic cycles as is practically possible. In addition, such an engine should be capable of maximising the efficiency of the overall driving cycle by conserving vehicular kinetic energy during braking by utilisation of regenerative braking. In addition, the engine should be capable of taking full advantage of spare electricity grid capacity during off peak hours to store energy for daily use. In addition, the engine should be capable of meeting exhaust emissions limits by reducing peak cycle temperatures. The Phased Induction Regenerative Engine herein described is fully capable of meeting these demands.

Internal combustion engines generally comprise a piston arranged to reciprocate within a cylinder and the piston is connected, via a connecting rod, to a crank shaft such that the reciprocating movement of the piston within the cylinder is converted into rotational movement of the crank shaft. The crank shaft is usually directly connected, or indirectly connected via a gearbox, to an output shaft, such that a useful rotating output can be obtained from the engine.

Most internal combustion engines are driven by the explosive force of a charge (usually comprising a fluid fuel/air mixture) ignited within the cylinder, which drives the piston downward to rotate the crank shaft. The ignition of charge causes it to expand rapidly, thus creating a high positive pressure within the cylinder to force the piston downwards. Even with the advances in modern engine technology that enable the introduction and composition of the charge to be carefully timed and controlled, the ignition/power stroke of most internal combustion engines is still relatively thermodynamically inefficient.

The structure of an internal combustion engine must be designed to withstand the high pressures, forces and temperatures involved in the ignition/power stroke of the engine. Given that the power stroke is the heaviest duty cycle of the engine, and the stroke that gives rise to the useful output, the majority of the design considerations associated with internal combustion engines are focused in this area.

On the other hand, however, there is a competing requirement that detracts from the overall efficiency of the engine, namely the compression stroke, whereby the same engine components are configured to compress the charge prior to ignition. In almost all engines, the compression stroke is performed using the same apparatus as the power stroke, namely the piston and cylinder arrangement previously described, whereby the inertia of the crank shaft (and its associated flywheel and/or connected equipment) is used to drive the piston upwards within the cylinder to compress the charge prior to ignition. The fundamental problem with this arrangement is that the adiabatic heat of compression raises the charge temperature to such a degree that any gain from regenerative use of heat from the exhaust will add very little to overall cycle efficiency.

As such, there are two inherent flaws in the design and construction of known internal combustion engines, namely that: the engine must compress the charge adiabatically in each cycle, which not only increases the work used during the compression stroke but also raises the charge temperature to such a degree that the extra complexity required to regeneratively make use of exhaust heat is not justified.

A need therefore arises for a new type of internal combustion engine that addresses one or more of the above problems and which provides an improved and/or alternative internal combustion engine, and ideally, an engine whose construction lends itself to additional features such as regenerative braking, off peak storage of energy from the electricity grid or indeed any energy source which can compress air.

SUMMARY OF INVENTION

The present disclosure relates to internal combustion engine as set forth in the impendent claims.

Suitably, the invention separates the induction and power strokes of the engine such that the piston is not responsible for pressurising the charge during a compression stroke. The internal combustion engine thus has no compression stroke as such because the charge (comprising the fuel-air mixture) is compressed externally of the engine, and not by the engine itself. Advantageously, such a configuration permits a more efficient means of compressing the charge, compared with a conventional internal combustion engine whereby the charge is compressed by the piston during its upward stroke. Further, because the engine has no "compression stroke" as such, it is possible to use every downward movement of the piston as a power stroke, thus yielding the higher efficiencies only associated hitherto with two-stroke engines.

Put another way, the engine is configured to ignite the fuel-air mixture within the cylinder to obtain a power stroke during its downward movement in a conventional manner and to exhaust the combustion products during the piston's upward stroke in a convention manner. However, the compression of the charge is performed externally of the engine, for example, using a multi-stage compressor, which is more efficient than using an upward stroke of the piston, and the induction stroke is performed differently also: i.e. the pre-pressurised air and fuel are introduced into the induction chamber, rather than into the cylinder during its upward and downward strokes, respectively.

The adjustable volume induction chamber comprises a secondary cylinder in fluid communication with the cylinder and a secondary piston within the secondary cylinder. Means is provided for biasing the secondary piston towards a position that increases the internal volume of the secondary cylinder. The biasing means may comprise a spring cooperating with the secondary piston. In a preferred embodiment, the secondary cylinder comprises a closed-ended cylinder, and a conduit is provided that provides fluid communication between the pressurised air supply and a volume of the secondary cylinder located between the secondary piston and the closed end of the secondary cylinder. A backing valve associated with the conduit is suitably provided for selectively closing the conduit and a control means is also suitably provided for opening and closing the backing valve depending on the position of the secondary piston relative to the secondary cylinder. The charge of compressed air delivered to the engine can thus be infinitely varied between minimum and maximum positions to control the power output of the engine.

By biasing the secondary piston using the same pressurised air supply as the charge for the engine, the pressures can be selectively balanced on opposite sides of the secondary cylinder. However, by using compressed air to bias the secondary piston, ignition of the charge within the engine's cylinder (at a much higher pressure than the air induction pressure) can allow the secondary piston to move within the secondary cylinder the effect of which can reduce the peak cycle pressure during fuel ignition and combustion leading to a reduction in NOX emissions.

In an embodiment of the invention, the air inlet port may communicate directly with the induction chamber. However, the air inlet port may also communicate indirectly with the induction chamber, for example, via an air inlet conduit, which air inlet conduit may comprise a channel, groove or recess in the piston or piston crown. Suitably, the piston crown, or air inlet has a shape and/or configuration adapted to optimise swirl/turbulence/mixing of the fuel air charge and/or minimising exhaust emissions The air inlet valve is operatively connected to a timing apparatus configured to synchronise the opening and closing of the air inlet port in relation to the position of the piston within the cylinder. The timing apparatus is configured to open the air inlet port as the piston approaches top dead centre (TDC), for example, as the piston reaches TDC or as the piston approaches TDC within substantially 15, 10, 5, 2 or 1 degrees. Such a configuration enables the induction of air into the induction chamber to take place almost instantaneously and conditions made available for fuel injection and ignition while the piston is at substantially TDC. Secondly, by inducting the air at, or substantially at, TDC, the engine's piston does not have to do work to re-compress the inducted air, thereby reducing the energy loss in the engine (i.e. the work done by the engine).

Further, the timing apparatus is configured to close the air inlet port as the piston approaches or passes top dead centre by a small angle, for example, substantially 1, 2, 5, 10 or 15 degrees. Such a configuration enables the induction of air into the induction chamber to be shortened as much as possible, which has two main advantages: Firstly, the duration of the power stroke can be extended, thereby allowing more time for the fuel-air mixture to burn, thus improving the conversion of chemical energy to useful output work. Secondly, the volume to surface area ratio of the induction chamber can be optimised to ensure minimum cooling of the charge by the secondary cylinder walls and secondary piston crown to minimise CO emissions.

Any suitable type of fuel injector may be used. Suitably, the fuel injector is operatively connected to a timing apparatus configured to synchronise the injection of fuel in relation to the position of the secondary piston within the secondary cylinder. Suitably, the timing apparatus is configured to synchronise the injection of fuel substantially simultaneously with the closing of the air inlet port. Such a configuration maximises the amount of time for the air and fuel to mix to form the charge for the engine's power stroke.

The engine suitably further comprises a connecting rod connecting the piston to a crank shaft such that reciprocation of the piston within the cylinder is convertible, in use, to rotational movement of the crank shaft.

An exhaust port communicating with the cylinder is also suitably provided, along with an exhaust valve for selectively opening and closing the exhaust port. Again, a timing apparatus is suitably provided for synchronising the opening and closing of the exhaust port in relation to the position of the piston within the cylinder, for example, to open of the exhaust port as the piston rises within the cylinder and/or to close the exhaust port as the piston approaches TDC, or approaches TDC within substantially 15, 10, 5, 2, or 1 degrees.

The engine is connected to a pressurised air supply, such as a pressurised air reservoir. The reservoir can be topped-up by a compressor. Additionally or alternatively, the pressurised air supply suitably comprises a multi-stage air compressor. Using multi-stage air compressor can be advantageous because the temperature of the compressed air at the compressor's output can be much lower than the temperature of an equivalent quantity of air compressed in a single-stage compressor (cf. the compression stroke of a conventional internal combustion engine). This affords considerable scope, therefore, for recovering heat from the engine as the inducted air from a multi-stage air compressor is notionally lower than the exhaust temperature of the engine. The expansion of the compressed air during the engine's power stroke, ignoring the heat-input caused by the ignition of the charge, causes the air's temperature to reduce. As such, in a conventional internal combustion engine, the temperature rise associated with the compression stroke is effectively lost during the power stroke. However, if the air is compressed externally, as proposed in the invention, the notional starting temperature of the compressed air in the charge is much lower, and thus, during the power stroke, the temperature drop is correspondingly lower. However, by starting from a notionally lower temperature, additional heat can be added to the inducted air, for example, by recovery of heat from the exhaust gasses. The added heat (e.g. the recovered exhaust gas heat added to the inducted air) can be readily dissipated in the power stroke of the engine by expansion, and so it is possible, by fitting the engine with a suitable multi-stage compressor and exhaust heat recovery system, to maximise and/or improve the thermodynamic efficiency of the engine.

DETAILED DESCRIPTION

In FIGS. 1 to 7, an internal combustion engine 10 comprises a piston 12 mounted to reciprocate within a cylinder 14 and a connecting rod 16 connects the piston 12 to a crankshaft (not shown). Ignition of a charge (a fuel-air mixture) above the piston 12 forces it down the cylinder 14 to drive the crankshaft and produce a rotational output.

Figure 1:
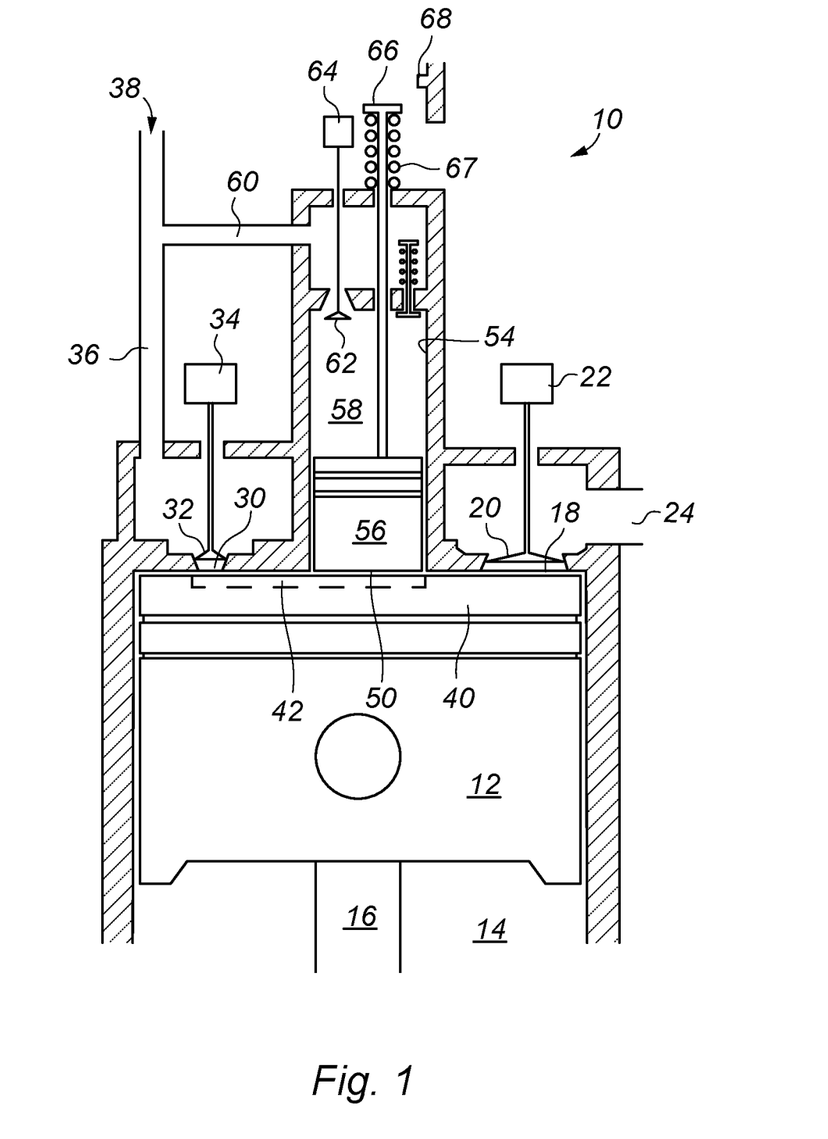
FIGS. 1 to 7 are a sequence showing the operation of an engine in accordance with the invention.

The cylinder 14 has an exhaust port 18 that is selectively opened and closed by an exhaust valve 20, whose operation is controlled by an electrical and/or mechanical exhaust timing apparatus 22. During the exhaust stroke, i.e. as the piston 12 rises within the cylinder 14, the exhaust valve 20 is opened to allow combustion products to be forced out of the cylinder 14, via the exhaust port 18 to an exhaust manifold 24.

The cylinder 14 also has an air inlet port 30 through which compressed air (at, say, 20 bar) can be let into the cylinder 14. The air inlet port 30 is selectively opened and closed by an air inlet valve 32, whose actuation is controlled by an electrical and/or mechanical air inlet timing apparatus 34. The air inlet port 30 is connected, via a conduit 36, to a supply of compressed air 38.

The piston 12 comprises a piston crown 40, which has a groove 42 machined into it. One end of the groove 42 registers with the air inlet port 30 to provide, when the piston is at TDC, a conduit extending between the air inlet port 30 and an induction chamber 50.

The timing of the exhaust valve 20 is configured, by the exhaust timing apparatus 22, to close before the air inlet port 30 is opened by the air inlet timing apparatus 34. Thus, when the air inlet valve 32 is opened, the piston 12 is substantially at TDC and the groove 42 provides a conduit extending between the air inlet port 30 and the induction chamber 50, which conduit is bounded by the groove 42 in the piston crown 40 and the upper internal wall 44 (head) of the cylinder 14.

The induction chamber 50 is formed as a closed-ended cylinder 54 whose open end communicates directly with the interior of the cylinder 14. A secondary piston 56 is located within the secondary cylinder 54 and is biased towards the main piston 12 so as to minimise, at rest, the internal volume of the induction chamber 50.

Figure 2:
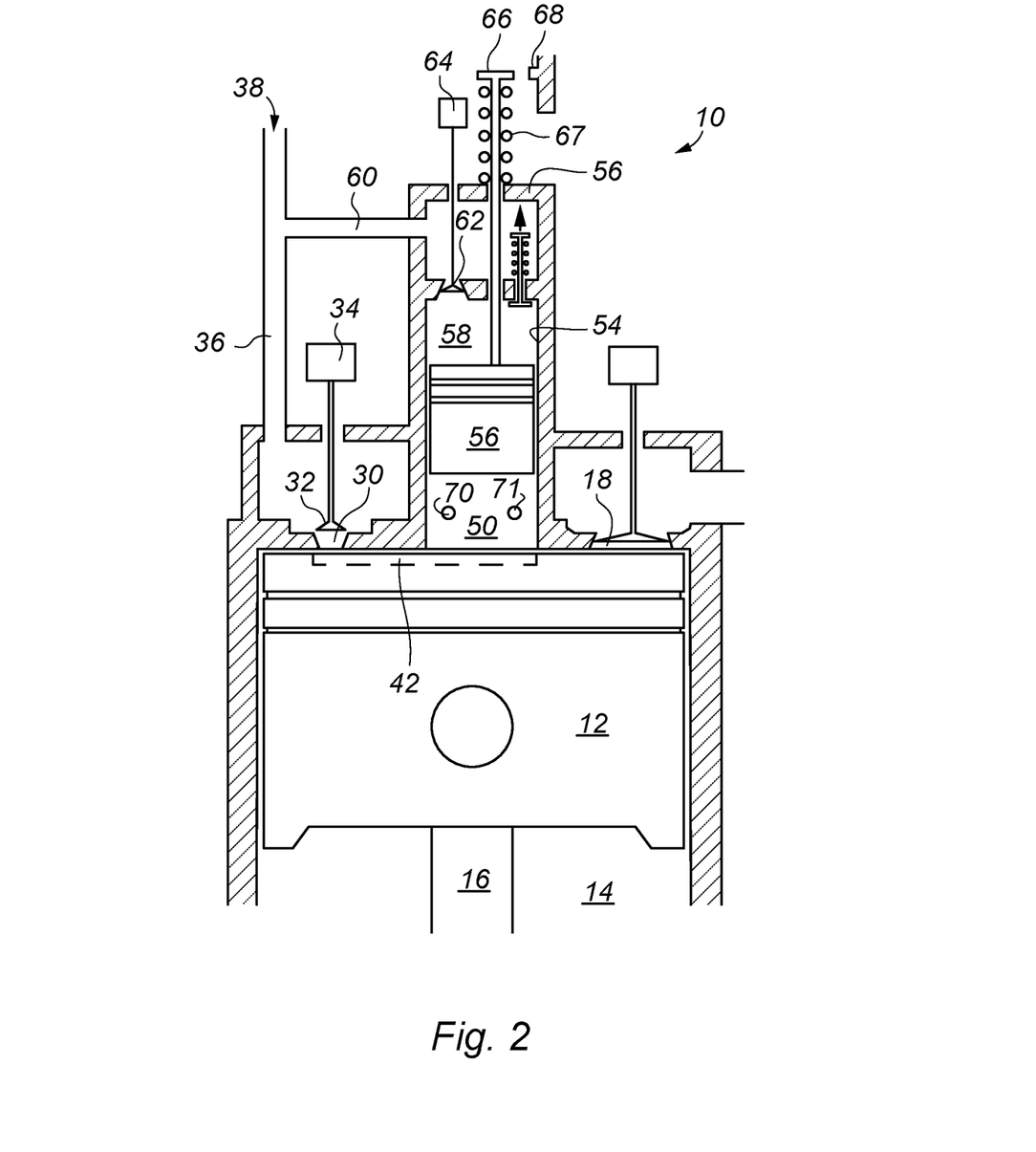

When the air inlet valve 32 is opened, compressed air 38 flows into the induction chamber 50, via the conduit 42, and balances the pressure in backing volume 58 above the secondary piston 56, as is shown in FIG. 2 of the drawings. This allows the compressed spring 67 to raise the secondary piston 56 instantaneously.

A balancing conduit 60 provides fluid communication between the compressed air supply 38 and the closed-off end of the secondary cylinder, i.e. into a backing volume 58 above the secondary piston 56. A backing valve 62 is used to open and close the supply of compressed air 38 from the backing conduit 60 in relation to the position of the secondary piston 56. This is accomplished by a backing valve timing device 64 that monitors the position of a marker 66 rigidly connected to the secondary piston 56 relative to a control index point 68. When the secondary piston 56 moves beyond a certain point, in this case, then the marker 66 passed the control index 68, the backing valve 62 is closed thus allowing the pressure within the backing volume 58 to rise as the secondary piston rises to the point where the unequal pressure resists further opening by spring force.

When, however, the backing valve 62 is opened, the air pressure within the induction chamber 50 and backing volume 58 equalise, thereby providing a net neutral force on the secondary piston 56 but then subject to opening force of spring.

Figure 3:
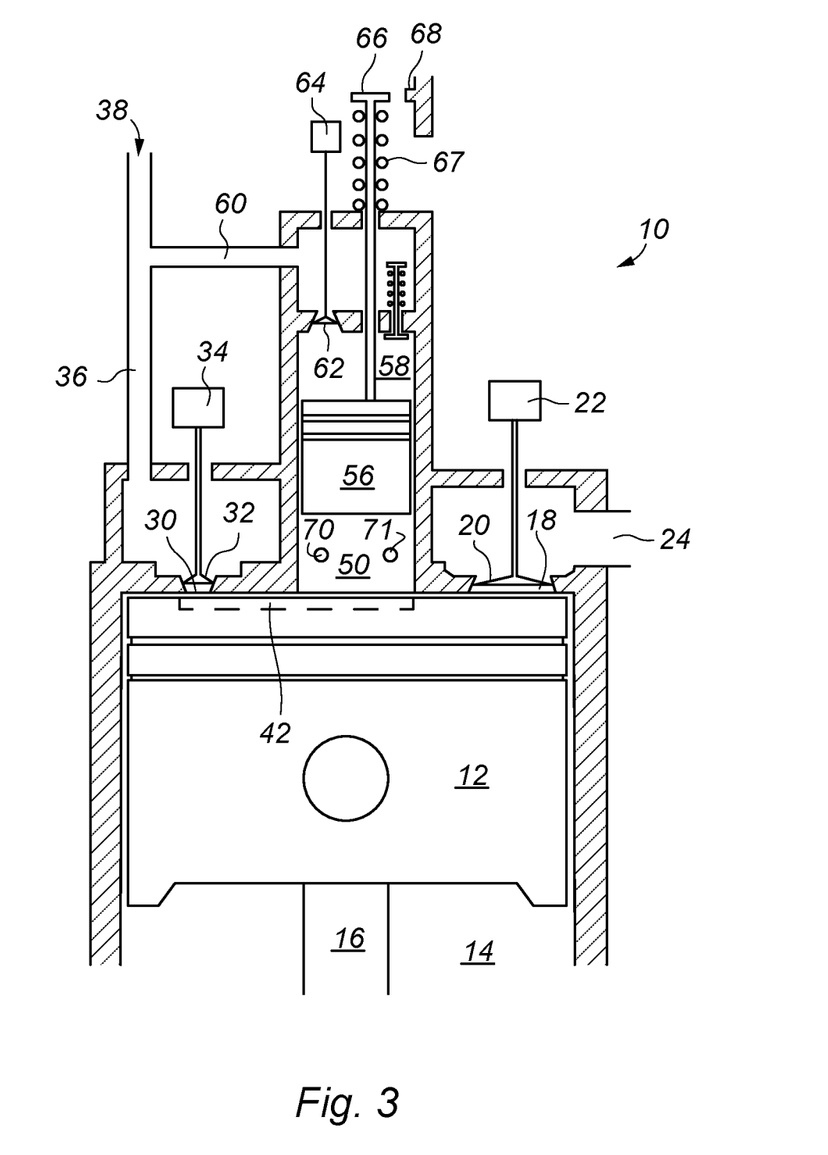
Figure 4:
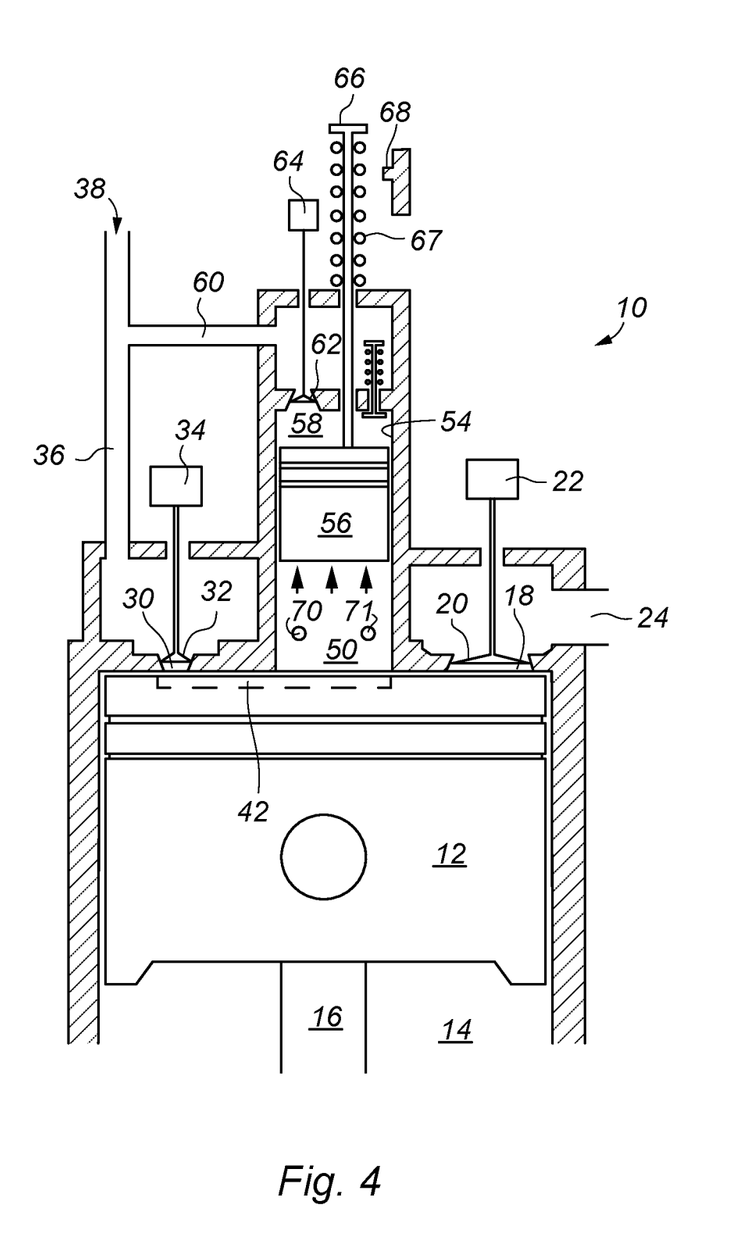

In FIG. 3, the air inlet port 30 is closed and fuel is injected and ignited in the induction chamber via injectors 70 and ignitor 71 and it will be seen from FIG. 4 that as pressure within the induction chamber increases as a result, thereby displacing the secondary piston 56 yet further until pressures equalise.

Figure 5:
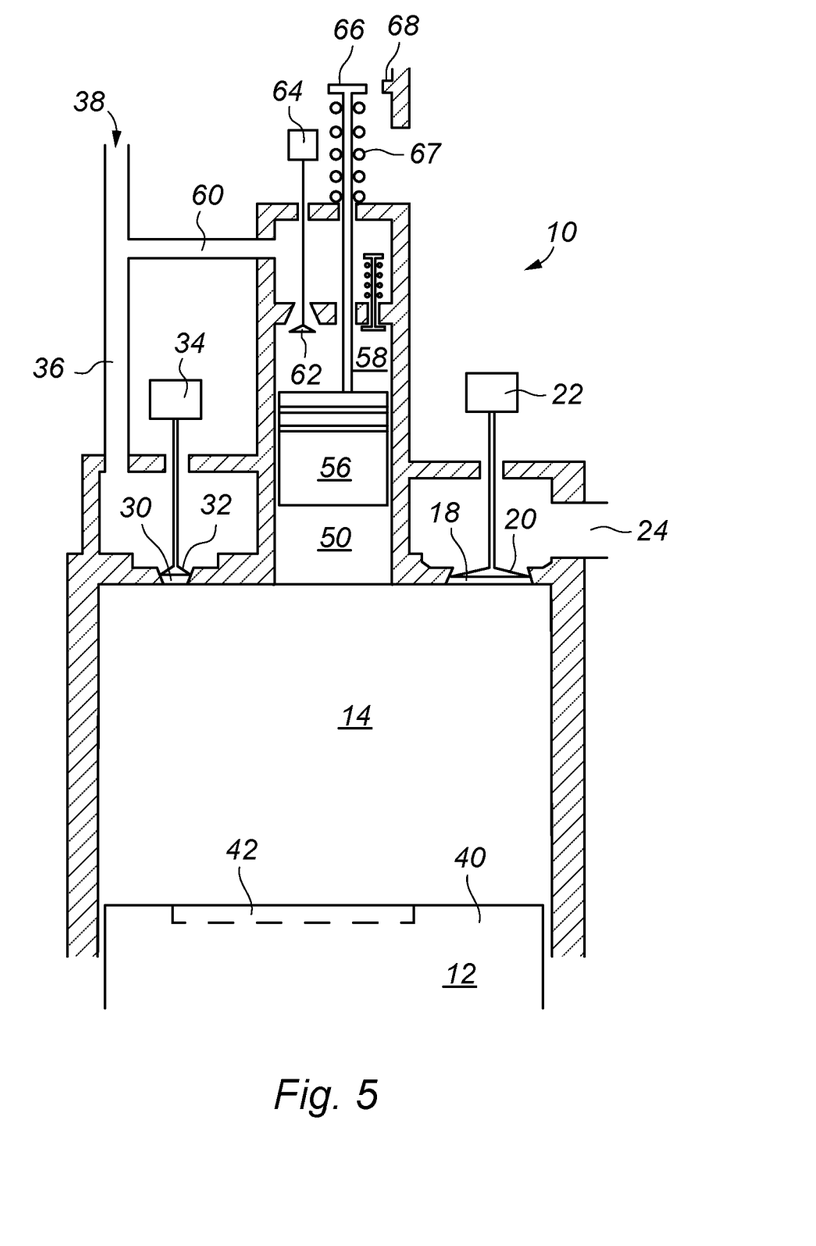
Figure 6:
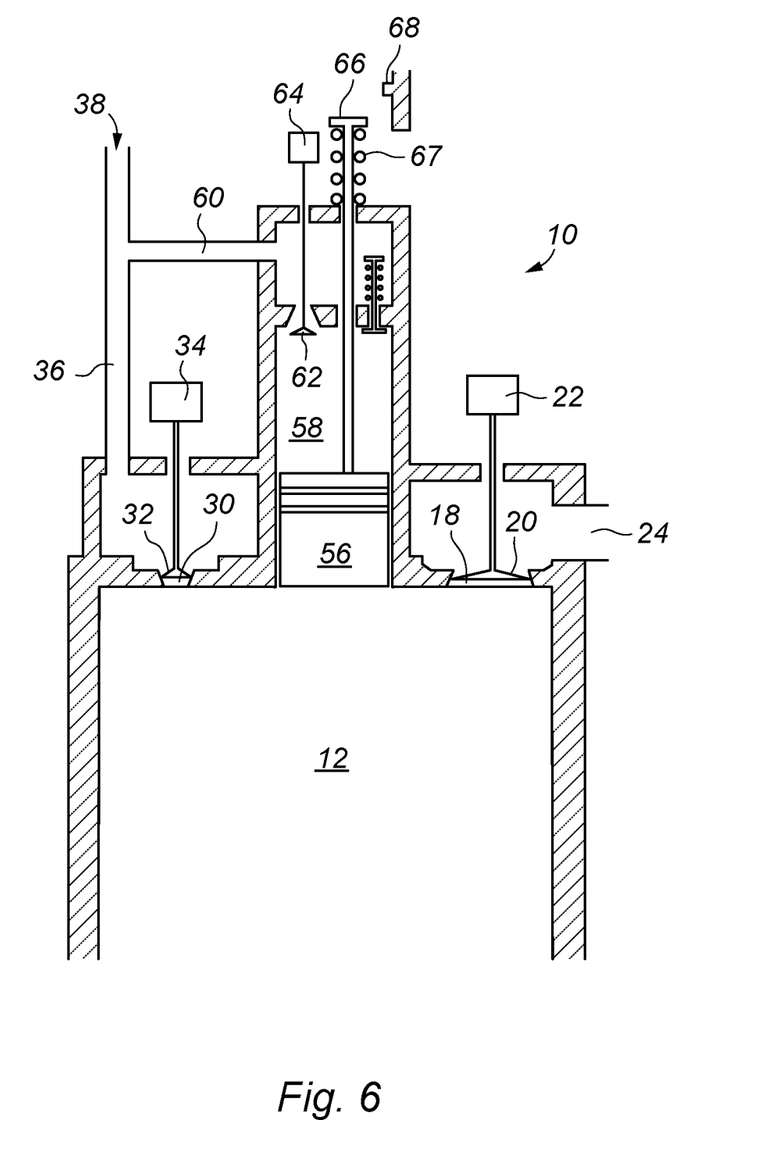

In FIG. 4, the fuel-air mixture within the induction chamber 50 is ignited (either temperature-induced auto-ignition, as in the case of a diesel cycle engine, or using a sparking plug or glow plug), and the fuel-air mixture expands rapidly, as shown in FIG. 5 of the drawings, thus forcing the engine's main piston 12 downwards in a power stroke. Initially, the secondary piston 56 will rise, against the force of the compressed air trapped in the backing volume 58, thus limiting peak cycle pressures and temperatures but it will be appreciated that the pressure drop associated with the downward movement of the main piston 12 counteracts this effect. As can be seen in FIG. 6, the secondary piston 56 eventually falls and the marker 66 passes by the control index 68, thereby triggering the timing device 64 to re-open the backing valve 62 to allow compressed air into the backing volume 58 thereby forcing the secondary piston down overcoming the spring upward force, resetting the system and returning the secondary piston 56 to the bottom of its stroke as determined by a damped stop shoulder on the secondary piston rod (not shown), to prevent the spring from pushing the secondary piston into the cylinder.

The power output of the engine can be controlled by moving the control index 68 relative to marker 66. The control index 68 can be allied to a linear movement from the power control system (e.g. a throttle position setting) to directly influence the opening and closing of valve 62 which in turn imposes infinitely variable limits between the maximum and minimum limits of the secondary piston travel.

Figure 7:
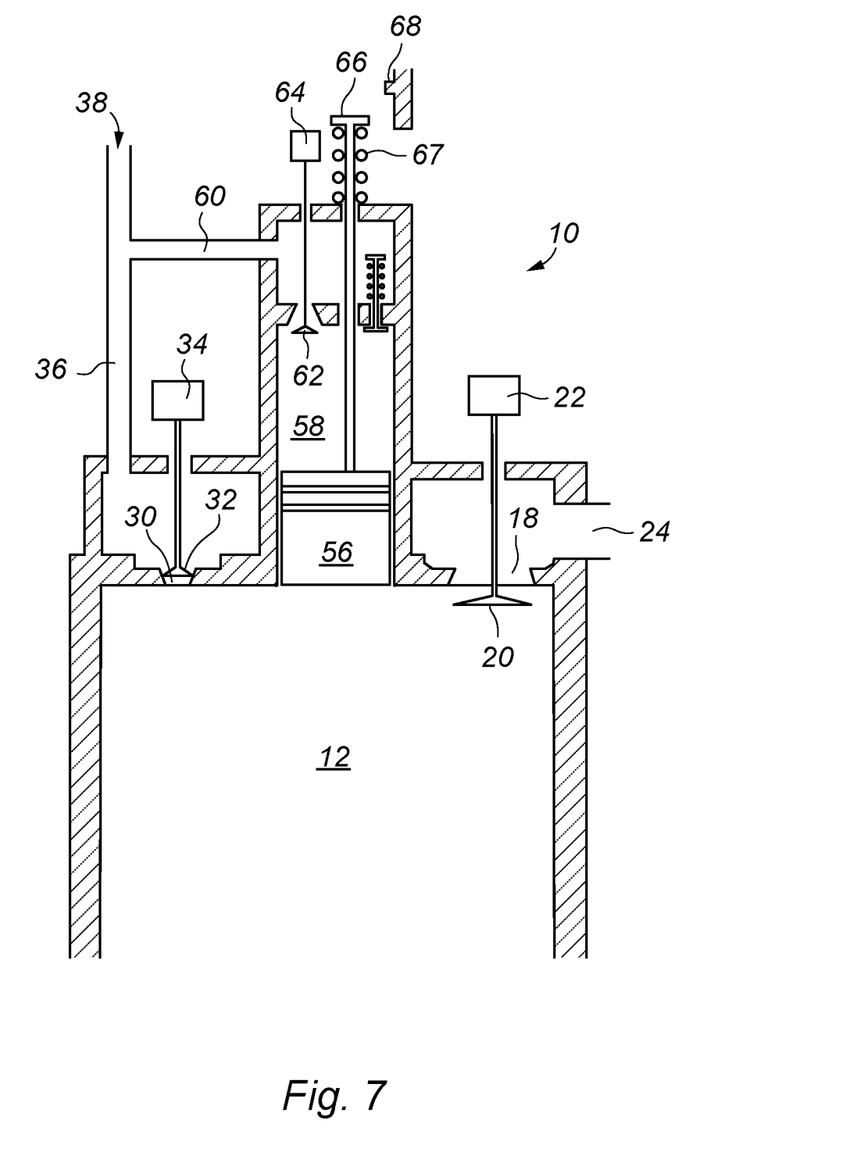

In FIG. 7, at the end of the power stroke, the piston 12 (not visible) rises again, and the exhaust valve 20 is opened to allow combustion products to escape, optimally to the regenerator where heat is given up to the incoming air from the compressor.

The sequence is repeated in successive cycles of the engine 10 to provide useful output power at the crankshaft (not shown).

It will be noted from the drawings, that the sequence of FIGS. 1 to 4, i.e. the induction and ignition strokes, are carried out whilst the piston 12 is at, or very close to, TDC. This can be accomplished by the use of precise timing devices 22, 34, 64, which allow the induction and ignition to take place substantially at TDC, thereby maximising the duration of the power and exhaust strokes, thus improving the efficiency of the engine 10. This is all made possible by the provision of the induction chamber 50 (secondary piston 56 and cylinder 54) which allows an additional volume, rather than the internal volume of the main cylinder 14 to be used to mix the fuel and air, and for the timing of the induction and mixing steps to be devolved somewhat from the timing of main piston 12.

In known "external compression" engines, i.e. those not having the induction chamber of the invention, the induction and ignition of the charge needs to be performed as the piston approaches, passes through, and passes by, TDC. Due to the fluidic nature of the air and fuel, and because the internal volume of the main cylinder itself needs to be used, the timing of the opening of the air inlet valve and fuel injectors usually needs to be ahead of TDC (to achieve adequate induction and mixing), whereas the subsequent closing of the valves needs to take place some considerable time (e.g. >15 degrees) after TDC, thereby reducing the duration of the power stroke and degrading the overall efficiency of the engine. In stark contrast, the engine of the invention utilises a high pressure (e.g. 20 bar) compressed air supply, thereby reducing fluidic lag, and an induction chamber, so the induction of air into the engine does not need to be related to the available volume of the main cylinder. As such, most of the timing, control and efficiency problems associated with known "external compression" engines can be addressed and/or overcome by the invention. Further flexibility in timings of events such as earlier closure of the exhaust valve and advancement of the air inlet and ignition sequence are also possible, ideally without any loss of efficiency.

Figure 8:
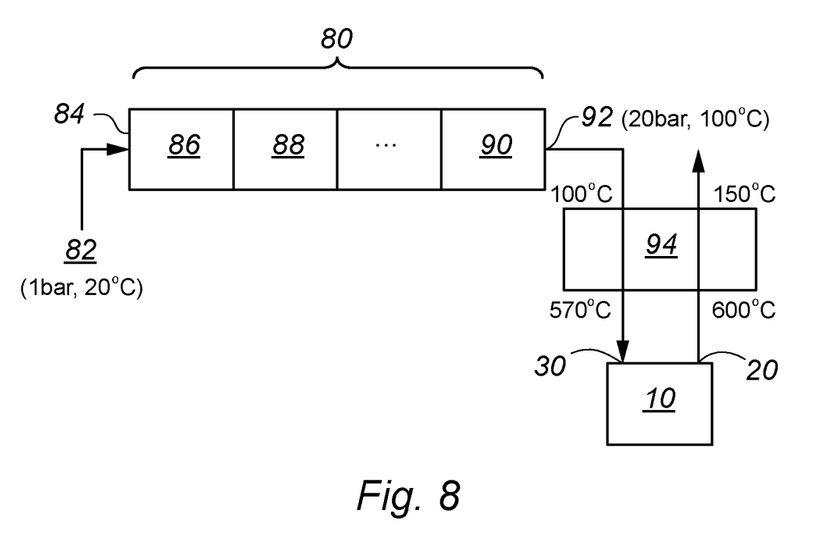
FIG. 8 is a schematic diagram showing a heat recovery system fitted to the engine.

Finally, FIG. 8 shows how, by using a multi-stage air compressor, waste heat from the engine 10 can be recovered. In FIG. 8, a multi-stage air compressor 80 is used as the source of compressed air 38 at the inlet port 30, for the engine 10. The multi-stage air compressor 80 takes ambient air 82, say at 1 bar, 20 degrees centigrade, at its inlet 84 and compresses it via a number of stages 86, 88, 90, etc. At each stage 86, 88, 90, the air is compressed substantially isothermally resulting in a compressed air output at the compressor's outlet 92, of say 20 bar, 100 degrees centigrade. The outlet 92 is connected to a heat exchanger 94 and then to the air inlet port 38 of the engine 10 as previously described. The engine's exhaust port 24 is similarly connected to the heat exchanger 94 such that the exhaust gasses, at, say 600 degrees centigrade, are used to pre-heat the compressed air entering the engine 10 via the inlet port 38, from say 100 degrees centigrade to say, 570 degrees centigrade. By such a configuration, the waste heat from the engine 10 can be recovered by heating the compressed air at the inlet thereby improving the overall thermodynamic efficiency of the engine 10. Low Heat Rejection technology (LHR), can also be applied to the engine components and maximise the heat available for recovery in the exhaust from the engine.

It will be appreciated that the invention is not restricted to the details of the foregoing embodiments, which are merely exemplary of the invention, and not restrictive. For example, the air inlet port 38 could be directly connected to the induction chamber 50, rather than via the channel 42, the shape, configuration and relative dimensions of any of the components could be altered without departing from the invention, the pressures, temperatures, timings and volumes indicated are exemplary only and, of course, a multi-cylinder engine could fall within the scope of the invention, even though it has been described, for illustrative simplicity only, in relation to a single piston/cylinder arrangement.

The following statements are not the claims, but relate to various aspects of the invention:

Statement 1. An internal combustion engine comprising: a piston arranged to reciprocate within a cylinder; an adjustable volume induction chamber communicating with the cylinder; an air inlet port communicating with the induction chamber, the air inlet port being connectable, in use, to a pressurised air supply; an air inlet valve configured to selectively open and close the air inlet port; and a fuel injector communicating with the induction chamber, wherein the valve and fuel injector are together configured, in use, to deliver a charge comprising a fuel-air mixture into the induction chamber.

Statement 2. The internal combustion of statement 1, wherein the adjustable volume induction chamber comprises a secondary cylinder in fluid communication with the cylinder and a secondary piston within the secondary cylinder.

Statement 3. The internal combustion of statement 1 or statement 2, further comprising biasing means for biasing the secondary piston to reduce or increase the internal volume of the secondary cylinder.

Statement 4. The internal combustion of statement 3, wherein the biasing means comprises a spring, or pressure acting on the secondary piston, or any mechanism generating a net upward or downward force.

Statement 5. The internal combustion of statement 3 or statement 4, wherein the secondary cylinder comprises: a closed-ended cylinder; a conduit providing fluid communication between the pressurised air supply and a volume of the cylinder located between the secondary piston and the closed end of the secondary cylinder; and a backing valve associated with the conduit for selectively closing the conduit; and further comprising control means for opening and closing the backing valve depending on the position of the secondary piston relative to the secondary cylinder.

Statement 6. The internal combustion engine of statement 5, further comprising: a balancing conduit providing fluid communication between the compressed air supply and the closed-off end of the secondary cylinder; and a backing valve for opening and closing the supply of compressed air from the backing conduit in relation to the position of the secondary piston.

Statement 7. The internal combustion engine of statement 6, wherein the opening and closing of the backing valve is controlled by a backing valve timing device that monitors the position of a marker rigidly connected to the secondary piston relative to a control index point.

Statement 8. The internal combustion engine of statement 7 when dependent on statement 4, wherein when the marker passes the control index, the backing valve is closed thus allowing the pressure within the backing volume to rise as the secondary piston rises to the point where the unequal pressure resists further opening by the spring, and wherein when the backing valve is opened, the air pressure within the induction chamber and backing volume equalise, thereby providing a net neutral force on the secondary piston but then subject to opening force of the spring.

Statement 9. The engine of statement 6, 7 and 8, wherein the power output of the engine is controllable, in use, by moving the control index relative to marker.

Statement 10. The engine of statements 6 to 9, wherein the control index is operatively connected to a power control system of the engine.

Statement 11. The internal combustion of any preceding statement, wherein the air inlet port communicates directly with the induction chamber.

Statement 12. The internal combustion of statements 1 to 10, wherein the air inlet port communicates with the induction chamber via an air inlet conduit.

Statement 13. The internal combustion of statement 12, wherein the air inlet conduit comprises a channel in the piston.

Statement 14. The internal combustion of any preceding statement, wherein the air inlet valve is operatively connected to a timing apparatus configured to synchronise the opening and closing of the air inlet port in relation to the position of the piston within the cylinder.

Statement 15. The internal combustion of statement 14, wherein the timing apparatus is configured to open the air inlet port as the piston approaches top dead centre.

Statement 16. The internal combustion of statement 14, wherein the timing apparatus is configured to close the air inlet port as the piston approaches or passes top dead centre.

Statement 17. The internal combustion of any preceding statement, wherein the fuel injector is operatively connected to a timing apparatus configured to synchronise the injection of fuel in relation to the position of the piston within the cylinder Statement 18. The internal combustion of statement 17, wherein the timing apparatus is configured to synchronise the injection of fuel substantially simultaneously with the closing of the air inlet port.

Statement 19. The internal combustion of any preceding statement, further comprising a connecting rod connecting the piston to a crank shaft such that reciprocation of the piston within the cylinder is convertible, in use, to rotational movement of the crank shaft.

Statement 20. The internal combustion of any preceding statement, further comprising an exhaust port communicating with the cylinder, a valve for selectively opening and closing the exhaust port and a timing apparatus configured to synchronise the opening and closing of the exhaust port in relation to the position of the piston within the cylinder.

Statement 21. The internal combustion of statement 20, wherein the timing apparatus is configured to synchronise the opening of the exhaust port as the piston rises within the cylinder.

Statement 22. The internal combustion of statement 20 or statement 21, wherein the timing apparatus is configured to synchronise the closing of the exhaust port as the piston approaches top dead centre.

Statement 23. The internal combustion of any preceding statement, wherein the pressurised air supply comprises an air compressor.

Statement 24. The internal combustion of statement 23, wherein the pressurised air supply comprises a pressurised air reservoir.

Statement 25. The internal combustion of statement 24, wherein the air compressor comprises a multi-stage air compressor.

Statement 26. The internal combustion of statement 25, wherein the multi-stage air compressor comprises a plurality of stages, and wherein the multi-stage air compressor is optimised to compress air in stages, whilst minimising the temperature of the compressed air at its outlet.

Statement 27. The internal combustion of any preceding statement, further comprising a heat recovery system.

Statement 28. The internal combustion of statement 27, wherein the heat recovery system comprises a heat exchanger comprising a first circuit having a cold inlet operatively connected the compressed air supply and a hot outlet operatively connected to the air inlet of the engine; a heat transfer bridge thermally connecting the first circuit to a second circuit, and wherein the second circuit comprises a hot inlet operatively connected to an exhaust port of the engine and a cold outlet.

Statement 29. An internal combustion engine substantially as hereinbefore described, with reference to, and as illustrated in, the accompanying drawings.

The invention claimed is:

1. An internal combustion engine comprising:
   a piston arranged to reciprocate within a cylinder;
   an adjustable volume induction chamber communicating with the cylinder, the adjustable volume induction chamber comprising a secondary cylinder in fluid communication with the cylinder and a secondary piston within the secondary cylinder;
   an air inlet port communicating with the induction chamber, the air inlet port being connectable, in use, to a pressurised air supply;
   an air inlet valve configured to selectively open and close the air inlet port; and
   a fuel injector communicating with the induction chamber, wherein
   the valve and fuel injector are together configured, in use, to deliver a charge comprising a fuel-air mixture into the induction chamber such that induction of air into the engine does not need to be related to the available volume of the main cylinder, the internal combustion engine further comprising:
   biasing means for biasing the secondary piston to reduce or increase the internal volume of the secondary cylinder such that the volume of the charge of compressed air delivered to the engine is infinitely variable between minimum and maximum values to control the power output of the engine, and wherein
   the air inlet valve is operatively connected to a timing apparatus configured to synchronise the opening and closing of the air inlet port in relation to the position of the piston within the cylinder to open the air inlet port as the piston approaches substantially top dead centre and to close the air inlet port as the piston approaches or passes substantially top dead centre.

2. The internal combustion of claim 1, wherein the biasing means comprises a spring, or pressure acting on the secondary piston, or any mechanism generating a net upward or downward force.

3. The internal combustion of claim 1, wherein the secondary cylinder comprises: a closed-ended cylinder; a conduit providing fluid communication between the pressurised air supply and a volume of the cylinder located between the secondary piston and the closed end of the secondary cylinder; and a backing valve associated with the conduit for selectively closing the conduit; and further comprising control means for opening and closing the backing valve depending on the position of the secondary piston relative to the secondary cylinder.

4. The internal combustion engine of claim 3, further comprising: a balancing conduit providing fluid communication between the compressed air supply and the closed-off end of the secondary cylinder; and a backing valve for opening and closing the supply of compressed air from the backing conduit in relation to the position of the secondary piston.

5. The internal combustion engine of claim 4, wherein the opening and closing of the backing valve is controlled by a backing valve timing device that monitors the position of a marker rigidly connected to the secondary piston relative to a control index point.

6. The internal combustion engine of claim 5, wherein when the marker passes the control index, the backing valve is closed thus allowing the pressure within the backing volume to rise as the secondary piston rises to the point where the unequal pressure resists further opening by the spring, and wherein when the backing valve is opened, the air pressure within the induction chamber and backing volume equalise, thereby providing a net neutral force on the secondary piston but then subject to opening force of the spring.

7. The internal combustion engine of claim 4 wherein the power output of the engine is controllable, in use, by moving the control index relative to marker.

8. The internal combustion of claim 7, wherein the air inlet port communicates directly with the induction chamber.

9. The internal combustion of claim 8, wherein the air inlet port communicates with the induction chamber via an air inlet conduit.

10. The internal combustion engine of claim 4, wherein the control index is operatively connected to a power control system of the engine.

11. The internal combustion of claim 1, wherein the fuel injector is operatively connected to a timing apparatus configured to synchronise the injection of fuel in relation to the position of the piston within the cylinder.

12. The internal combustion of claim 1, wherein the heat recovery system comprises a heat exchanger comprising a first circuit having a cold inlet operatively connected the compressed air supply and a hot outlet operatively connected to the air inlet of the engine; a heat transfer bridge thermally connecting the first circuit to a second circuit, and wherein the second circuit comprises a hot inlet operatively connected to an exhaust port of the engine and a cold outlet.

* * * * *